(12) United States Patent
Huang

(10) Patent No.: US 6,199,669 B1
(45) Date of Patent: Mar. 13, 2001

(54) BRAKE CALIPER FOR A BICYCLE DISK BRAKE

(76) Inventor: Bill Huang, No. 5-15, Lun Ya Lane, Lun Ya Lee, Yuanlin Chen, Changhua Hsien (TW)

( * ) Notice: Subject to any disclaimer, the term of this patent is extended or adjusted under 35 U.S.C. 154(b) by 0 days.

(21) Appl. No.: 09/377,492

(22) Filed: Aug. 20, 1999

(51) Int. Cl.$^7$ .................................................. B62L 3/00
(52) U.S. Cl. ................. 188/24.22; 188/26; 188/73.32
(58) Field of Search ......................... 188/24.12, 24.22, 188/26, 73.31, 73.32, 242, 244, 245, 18 A, 24.11, 250 D, 250 E, 250 G

(56) References Cited

U.S. PATENT DOCUMENTS

| | | | |
|---|---|---|---|
| 5,950,772 | * 9/1999 | Buckley et al. | 188/26 |
| 6,003,639 | * 12/1999 | Buckley et al. | 188/26 |

\* cited by examiner

*Primary Examiner*—Matthew C. Graham
*Assistant Examiner*—Thomas J. Williams

(74) *Attorney, Agent, or Firm*—Varndell & Varndell, PLLC

(57) ABSTRACT

A brake caliper installed in the disk brake of a bicycle and worked with the brake disk of the disk brake, the brake caliper including a base having two receiving chambers and two cam shafts in the receiving chamber, two brake linings respectively mounted in the receiving chambers at two opposite sides of the brake disk and coupled to the cam shafts, and two spring members respectively fastened to the brake linings and secured to a respective locating rod at the cam shafts, wherein the brake linings each have a first positioning hole and a second positioning hole respectively disposed at two opposite ends of a groove thereof for the positioning of the spring members, a finger rod and a locating rod raised from the periphery and aligned with the groove in a line, and a cam shaft mounting hole for the positioning of the locating rod of the corresponding cam shaft; the spring members each have a substantially U-shaped head and a forked tail respectively inserted through the first positioning hole and second positioning hole at the corresponding brake lining and hung on the finger rod and locating rod at the corresponding brake lining, and a clamping portion connected between the head and the clamping forked tail and clamped on the locating rod at the corresponding cam shaft.

2 Claims, 5 Drawing Sheets

BRAKE CALIPER FOR A BICYCLE DISK BRAKE

BACKGROUND AND SUMMARY OF THE INVENTION

The present invention relates to a disk brake for a bicycle, and more particularly to a brake caliper for a bicycle disk brake which can easily be installed in the disk brake, and operated to clamp on the brake disk positively.

A bicycle is simple personal transportation vehicle, and can be used as a sports implement. A regular bicycle may be equipped with a disk brake, and operated to stop the bicycle from movement. A conventional bicycle disk brake is generally comprised of a brake disk fixedly fastened to the hub at the front fork of the bicycle, and a brake caliper mounted on lugs at the front fork and driven by a brake line to stop the brake disk from rotation. The brake caliper, as shown in FIGS. 1 and 2, comprises a base having two receiving chambers at two opposite sides of the brake disk, two cam shafts respectively mounted in the receiving chambers inside the base, and two brake linings respectively fastened to the cam shafts by screws. This brake caliper design is still not satisfactory in function. When replacing the brake linings, the cam shafts must be removed from the receiving chambers, then the screws must be disconnected from the cam shafts. This brake lining replacing procedure is complicated.

The present invention has been accomplished to provide a brake caliper for a bicycle disk brake which eliminates the aforesaid drawback. According to the present invention, spring members are respectively mounted on the brake linings, so that the brake linings can conveniently be installed in the respective cam shafts in the base without removing the cam shafts from the base.

DETAILED DESCRIPTION OF THE PREFERRED EMBODIMENT

Figure 1:
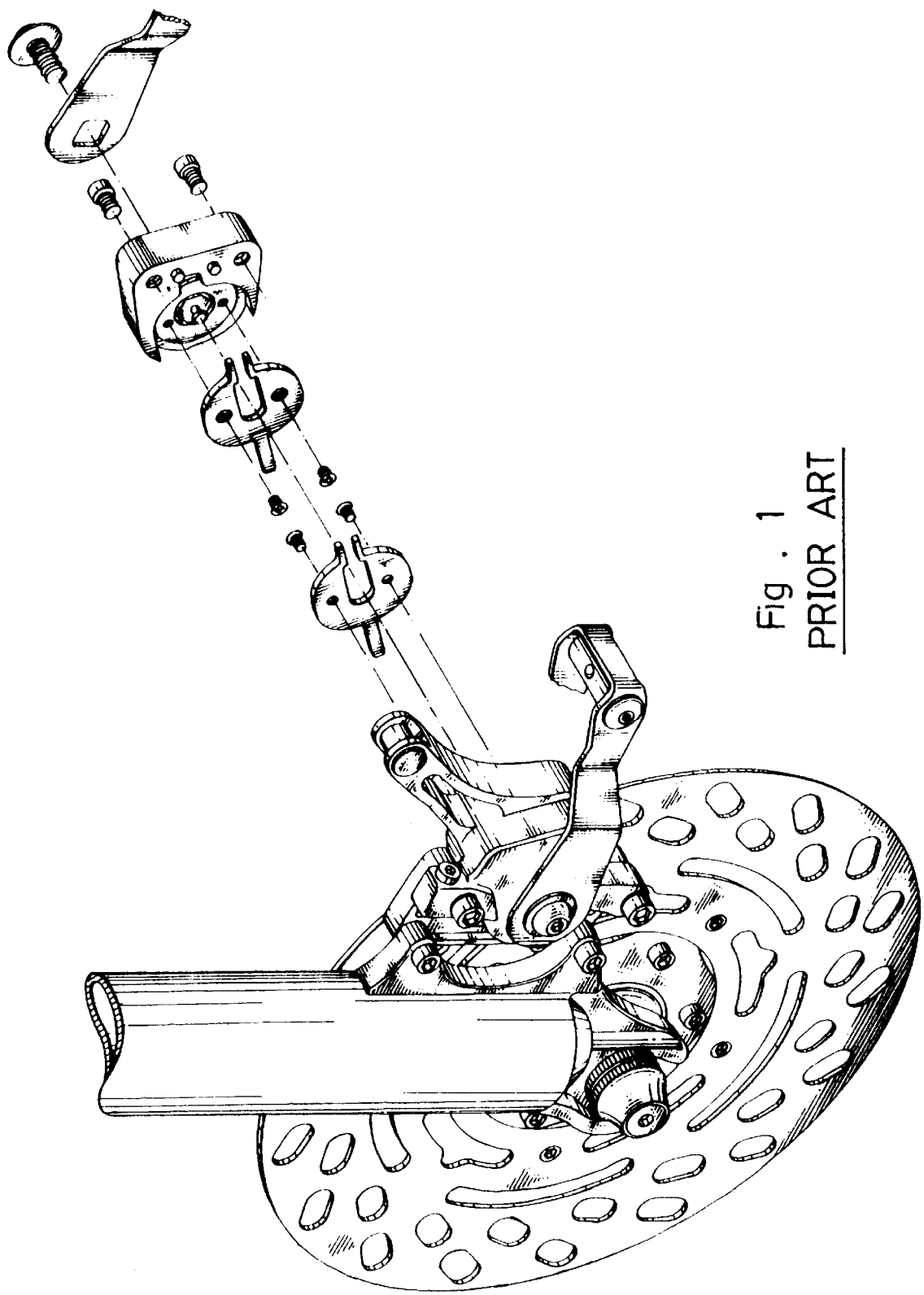
FIG. 1 is an exploded view of brake caliper according to the prior art.
Figure 2:
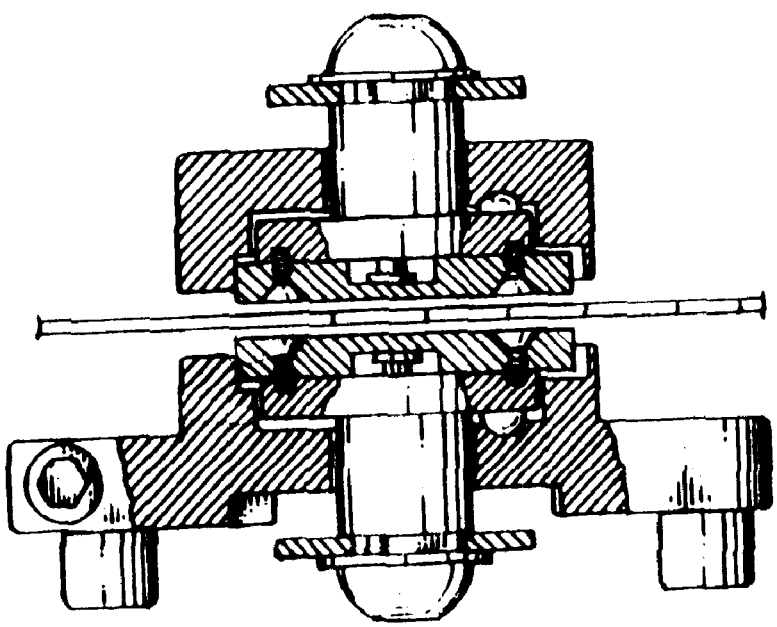
FIG. 2 is a sectional view showing the prior art brake caliper installed.
Figure 3:
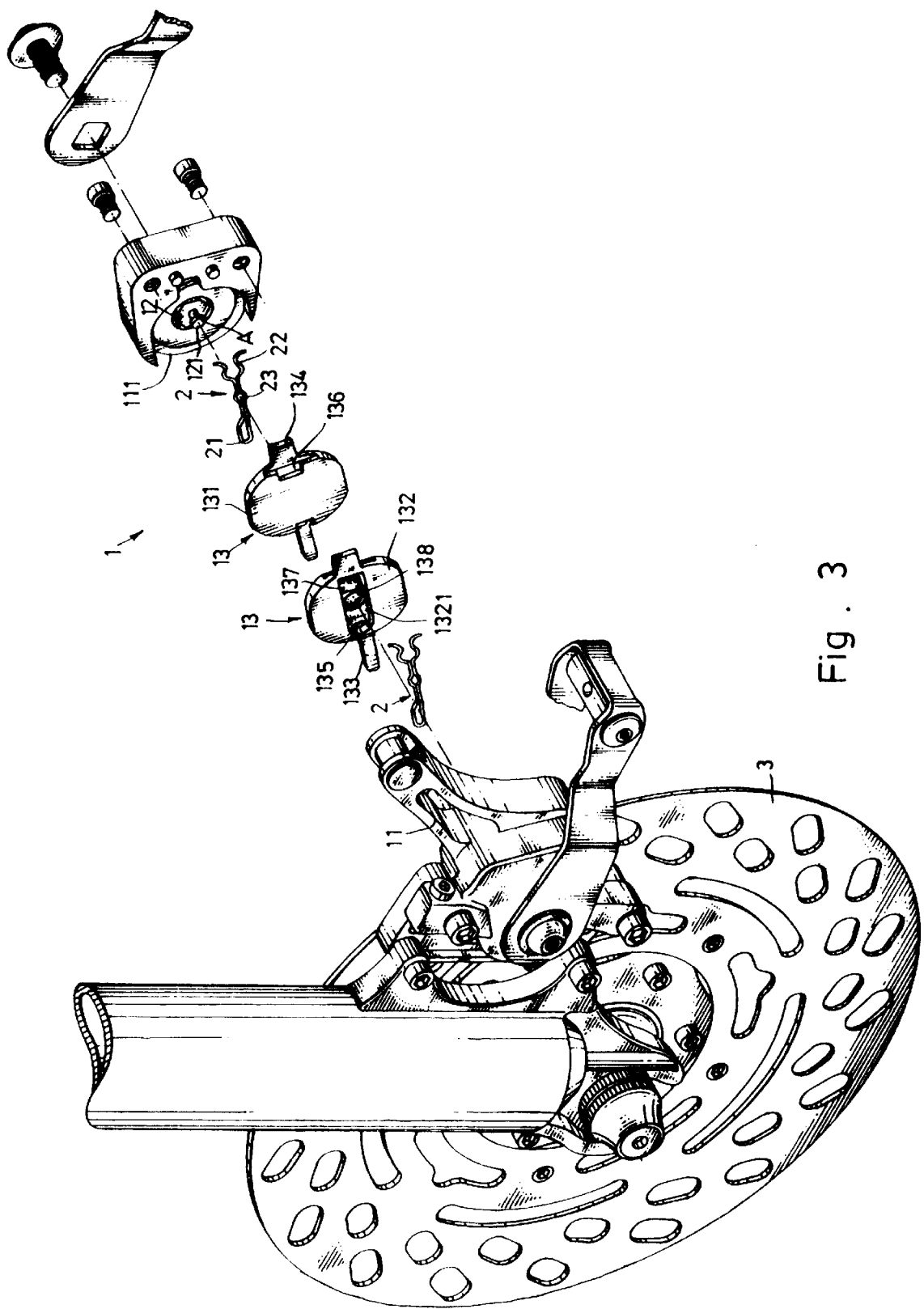
FIG. 3 is an exploded view of a brake caliper according to the present invention.
Figure 4:
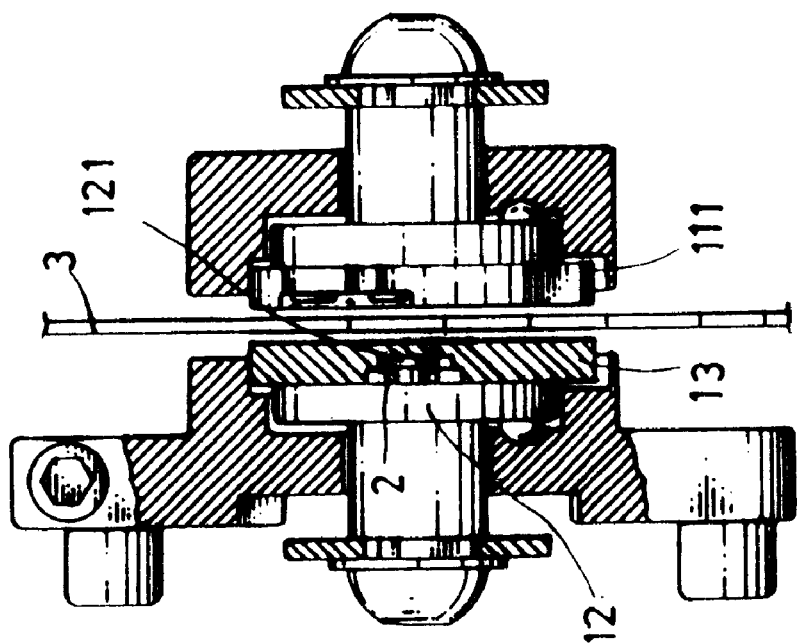
FIG. 4 is a sectional assembly of the present invention.

Referring to FIGS. 3 and 4, a brake caliper 1 is shown comprised of a base 11, two cam shafts 12, two brake linings 13, and two spring members 2. The cam shafts 12 are fixedly mounted in a respective receiving chamber 111 inside the base 11, each having a locating rod 121 for the positioning of the brake linings 13. The spring members 2 are respectively fastened to the brake linings 13. The brake linings 13 each comprise a friction portion 131 at an outer side, a positioning portion 132 at an inner side, a groove 1321 at the positioning portion 132, a finger rod 133 and a locating rod 134 raised from the periphery at two opposite sides and aligned with the groove 1321 in a line, a first positioning hole 135 and a second positioning hole 136 respectively disposed at two opposite ends of the groove 1321 for the positioning of the corresponding spring member 2, a sloping edge 137 connected between the groove 1321 and the second positioning hole 136, and a cam shaft mounting hole 138 adjacent to the sloping edge 137 for the positioning of the locating rod 121 of the corresponding cam shaft 12. The spring members 2 are respectively made by bending a steel wire into shape, each comprising a substantially U-shaped head 21, a forked tail 22, and a clamping portion 23 on the middle between the head 21 and the clamping forked tail 22. The head 21 is inserted through the first positioning hole 135 and hung on the finger rod 133 at the corresponding brake lining 13. The forked tail 22 is inserted through the second positioning hole 136 and hooked on the locating rod 134 at the corresponding brake lining 13. The clamping portion 23 is clamped on the locating rod 121 of the corresponding cam shaft 12. By clamping the clamping portion 23 of each spring member 2 on the locating rod 121 at the corresponding cam shaft 12, the respective brake lining 13 can easily and positively be installed in position.

Figure 6:
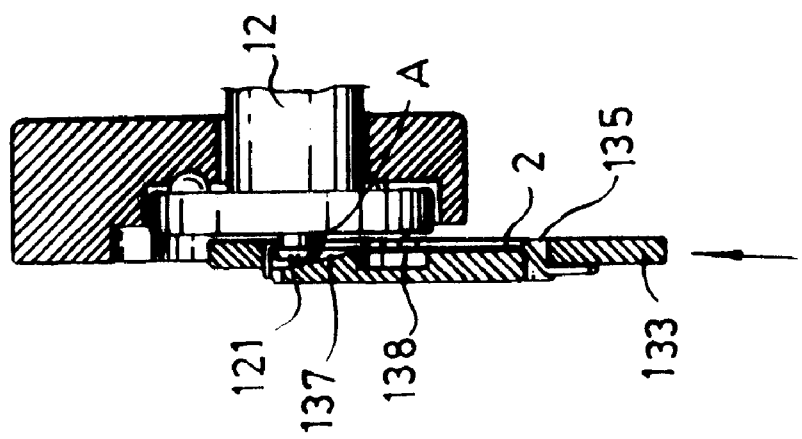
FIG. 6 is a sectional view taken along line 6—6 of FIG. 5.
Figure 7:
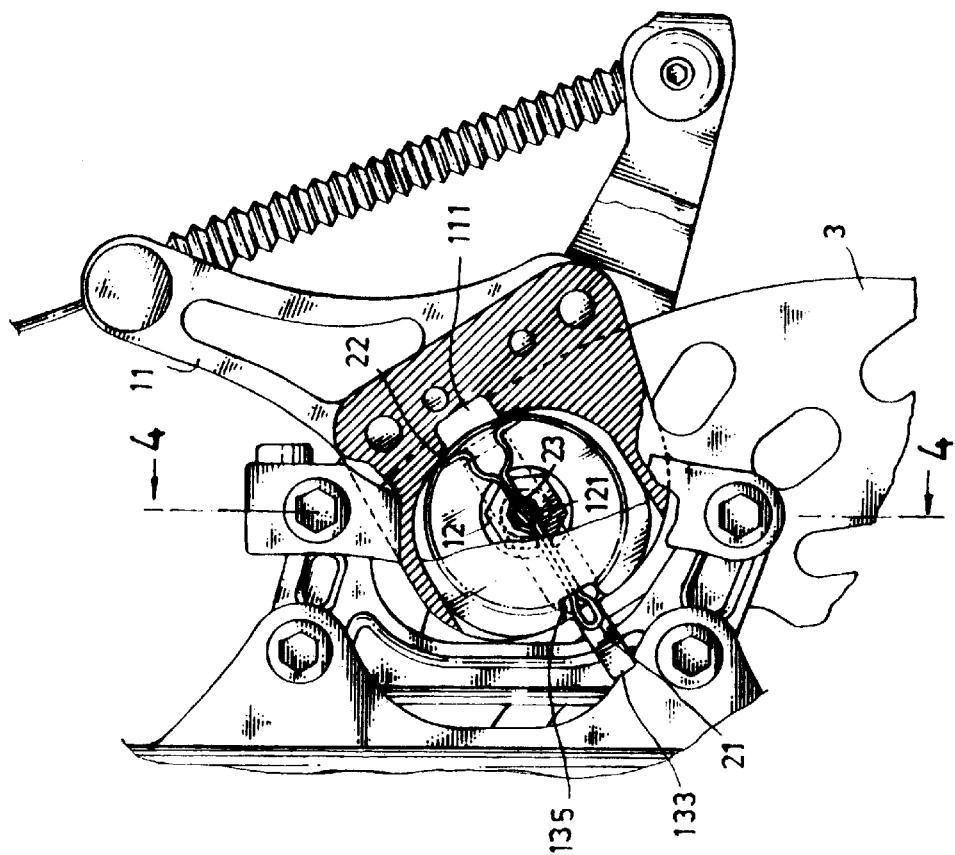
FIG. 7 is a perspective view in an enlarged scale of the present invention, showing the brake lining installed.
Figure 5:
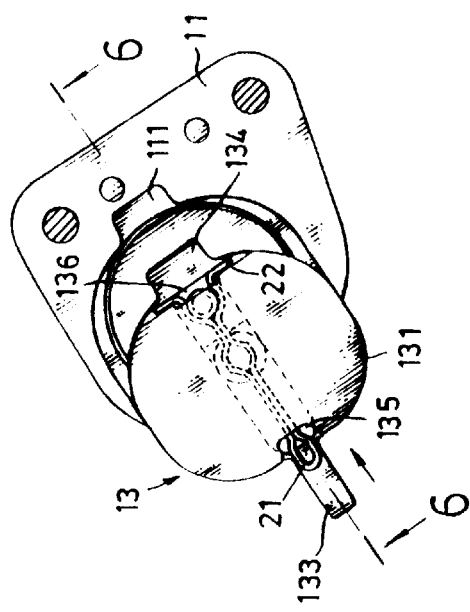
FIG. 5 shows the installation of the brake lining in the corresponding receiving chamber in the base according to the present invention.

Referring to Figures from 5 through 7, when installing the brake lining 13, it is not necessary to remove the corresponding cam shaft 12 from the base 11. Through the finger rod 133, the brake lining 13 can be held by hand and inserted into the corresponding receiving chamber 111 in the base 11, enabling the second positioning hole 126 to be obliquely coupled to the locating rod 121 at the corresponding cam shaft 12 (see FIG. 6), and then the brake lining 13 is moved with the hand to move the sloping edge 137 over the locating rod 121 and to force the forked tail 22 through the locating rod 121, enabling the locating rod 121 to be engaged into the clamping portion 23 (see FIG. 7).

Because each receiving chamber 111 of the base 11 is a recessed chamber fitting the corresponding brake lining 13, the brake lining 13 can be positively positioning in the corresponding receiving chamber 111 in the base 11 and secured in place by the locating rod 121 of the corresponding cam shaft 12. The locating rod 121 of each cam shaft 12 has an expanded head shaped like an arrowhead. Therefore, when one brake lining 13 is installed in the corresponding receiving chamber 111 in the base 11, a receiving space A is defined in the receiving chamber 111 around the locating rod 121 to receive the corresponding spring member 2.

Further, because the brake lining 13 is secured to the locating rod 121 at the corresponding can shaft 12 by the corresponding spring member 2, the brake lining 13 is not locked when installed. Therefore, the brake linings 13 can be flexibly adjusted and closely attached to two opposite side walls of the brake disk 3 when the brake caliper 1 is pulled up by the brake cable.

What is claimed is:

1. A brake caliper installed in the disk brake of a bicycle and worked with the brake disk of the disk brake, the brake caliper comprising a base having two receiving chambers at two opposite sides of the brake disk of the disk brake, two cam shafts respectively mounted in the receiving chambers in said base, said cam shafts each having a locating rod, two brake linings respectively mounted in the receiving chambers in said base and coupled to the locating rods of said cam shafts, and two spring members respectively fastened to said brake linings and secured to the locating rods of said cam shafts, said brake linings each comprising a friction portion at an outer side, a positioning portion at an inner side, a groove at said positioning portion, a finger rod and a locating rod raised from the periphery at two opposite sides and aligned with said groove in a line, wherein said brake lining each further comprise a first positioning hole and a second positioning hole respectively disposed at two opposite ends of said groove for the positioning of said spring members, a sloping edge connected between said groove and said second positioning hole, and a cam shaft mounting hole adjacent to said sloping edge for the positioning of the locating rod of the corresponding cam shaft; said spring members each comprise a substantially U-shaped head inserted through the first positioning hole at the corresponding brake lining and hung on the finger rod at the corresponding brake lining, a forked tail inserted through the second positioning hole at the corresponding brake lining and hooked on the locating rod at the corresponding brake lining, and a clamping portion connected between said head and said clamping forked tail and clamped on the locating rod at the corresponding cam shaft.

2. The brake claiper of claim 1 wherein said spring members are respectively formed of a steel wire bent into shape, and the forked tail of each of said spring members has a substantially Y-shaped profile.

* * * * *